(12) United States Patent
Kannan et al.

(10) Patent No.: US 7,594,517 B2
(45) Date of Patent: Sep. 29, 2009

(54) GAS SUPPLY FACILITY OF A CHAMBER AND A METHOD FOR AN INTERNAL PRESSURE CONTROL OF THE CHAMBER FOR WHICH THE FACILITY IS EMPLOYED

(75) Inventors: Hiroshi Kannan, Hachioji (JP); Tomio Uno, Osaka (JP); Ryousuke Dohi, Osaka (JP); Kouji Nishino, Osaka (JP); Osamu Nakamura, Osaka (JP); Atsushi Matsumoto, Osaka (JP); Nobukazu Ikeda, Osaka (JP)

(73) Assignees: Fujikin Incorporated, Osaka (JP); Tokyo Electron Ltd., Tokyo (JP)

( * ) Notice: Subject to any disclaimer, the term of this patent is extended or adjusted under 35 U.S.C. 154(b) by 88 days.

(21) Appl. No.: 10/566,495

(22) PCT Filed: Jul. 28, 2004

(86) PCT No.: PCT/JP2004/010708

§ 371 (c)(1),
(2), (4) Date: Jul. 6, 2006

(87) PCT Pub. No.: WO2005/013026

PCT Pub. Date: Feb. 10, 2005

(65) Prior Publication Data

US 2007/0193628 A1 Aug. 23, 2007

(30) Foreign Application Priority Data

Jul. 31, 2003 (JP) ............................. 2003-284527

(51) Int. Cl.
*G05D 7/06* (2006.01)
(52) U.S. Cl. .............................. 137/487.5; 137/601.01; 137/601.14

(58) Field of Classification Search .............. 137/487.5, 137/599.01–601.21
See application file for complete search history.

(56) References Cited

U.S. PATENT DOCUMENTS 5,158,108 A 10/1992 Semaan et al.

(Continued)

FOREIGN PATENT DOCUMENTS

JP 8-334546 A 12/1996

(Continued)

OTHER PUBLICATIONS

International Search Report issued in the corresponding application PCT/JP2004/010708 and completed Sep. 17, 2004 and mailed Oct. 5, 2004.

(Continued)

*Primary Examiner*—Stephen M Hepperle
*Assistant Examiner*—William McCalister

(57) ABSTRACT

The present invention prevents substantial reduction of flow rate control accuracy in a small flow quantity range, achieves accurate flow rate control over the entire range of flow rate control, and also allows control of a wide pressure range of a chamber with accurate flow rate control. Specifically, a gas supply facility having a plurality of pressure type flow controllers connected in parallel, and a third controller to control operation of the pressure type flow controllers to supply a desired gas exhausted by a vacuum pump to a chamber while controlling its flow rate, is provided wherein one pressure type flow controller is a controller used to control a gas flow rate range up to 10% of the maximum flow rate supplied to the chamber, while the remaining pressure type flow controllers are made to be ones controlling the rest of the gas flow rate range.

4 Claims, 9 Drawing Sheets

U.S. PATENT DOCUMENTS

| | | | |
|---|---|---|---|
| 5,875,817 A * | 3/1999 | Carter | 137/599.06 |
| 6,178,995 B1 * | 1/2001 | Ohmi et al. | 137/486 |
| 6,422,264 B2 * | 7/2002 | Ohmi et al. | 137/487.5 |
| 6,752,166 B2 | 6/2004 | Lull et al. | |
| 6,916,397 B2 | 7/2005 | Pfeiffer et al. | |
| 6,964,279 B2 | 11/2005 | Ohmi et al. | |
| 2002/0179148 A1 * | 12/2002 | Lull et al. | 137/487.5 |
| 2007/0193628 A1 | 8/2007 | Kannan et al. | |

FOREIGN PATENT DOCUMENTS

| | | |
|---|---|---|
| JP | 08-335846 A | 12/1996 |
| JP | 8-338546 A | 12/1996 |
| JP | 08-338564 A | 12/1996 |
| JP | 11-212653 A | 8/1999 |
| JP | 2000-240586 A | 9/2000 |
| JP | 2001-175336 A | 6/2001 |
| JP | 2002-116824 A | 4/2002 |
| JP | 2003-195948 A | 7/2003 |
| JP | 2000-137528 A | 5/2005 |
| WO | WO0196972 A1 * | 12/2001 |
| WO | WO 2005-013026 A1 | 2/2005 |

OTHER PUBLICATIONS

Office action dated Mar. 11, 2009 in co-pending related U.S. Appl. No. 11/278,909.

* cited by examiner (a)

(b)

(c)

he present invention is concerned with a facility for gas
GAS SUPPLY FACILITY OF A CHAMBER AND A METHOD FOR AN INTERNAL PRESSURE CONTROL OF THE CHAMBER FOR WHICH THE FACILITY IS EMPLOYED This is a National Phase Application in the United States of International Patent Application No. PCT/JP2004/010708 filed Jul. 28, 2004, which claims priority on Japanese Patent Application No. 2003-284527, filed Jul. 31, 2003. The entire disclosures of the above patent applications are hereby incorporated by reference.

FIELD OF THE INVENTION

The present invention is concerned with a facility for gas supply to a chamber utilized with semiconductor manufacturing facilities and the like, and a method for an internal pressure control of the chamber for which the facilities is employed.

BACKGROUND OF THE INVENTION

In recent years, gas supply facilities equipped with a so-called pressure type flow controller to be used for a gas supply facility to a process chamber have been widely used.

An example is illustrated in FIG. 8. It is so constituted that pressure type flow controllers C1, C2 and C3 and fluids switching valves D1, D2 and D3 are provided with a gas supply facility, and switching of fluids supplied to a process chamber E and flow rate adjustments are automatically performed by signals from a controller B (TOKU-KAI-HEI No. 11-212653 and others).

It is so constituted that, with the aforementioned pressure type flow controllers C1, C2 and C3, a flow quantity Qc passing through an orifice is computed with a formula Qc=KP1 by a computation device M by maintaining fluids pass through an orifice Ka under critical conditions (P1/P2 larger than approx. 2) as illustrated in FIG. 9, to open or close a control valve V (to regulate pressure P1 on the upstream side of an orifice) so that the difference Qy with a set flow rate Qs is made to be zero. Here, A/D designates a signal converter, and AP designates an amplifier (TOKU-KAI-HEI No. 8-338564).

As shown in FIG. 10, the internal pressure of the aforementioned process chamber E is maintained at a set value ($10^{-6}$-$10^2$ Torr) by continuously operating vacuum pumps VP1 and VP2 through an evacuation line Ex having a comparatively large bore equipped with an automatic pressure controller APC and a conductance valve CV.

A combination of a primary vacuum pump (a high vacuum pump) VP1 such as a turbo molecular pump and the like and a secondly vacuum pump (a low vacuum pump) VP2 such as a scroll pump and the like is widely employed for the aforementioned vacuum pump while an exhaust system for which one pump having a large exhaust volume and a large compression ratio is used has a disadvantage in manufacturing costs and the like, so it is not popular.

A fluids supply facility to a chamber shown in FIG. 8 has characteristics that pressure type flow controllers C1-Cn used for the facility are not influenced by internal pressure changes on the side of the chamber E. Therefore, the facility which allows comparatively stable control on the flow rate of the supply gas achieves an excellent, practical effect even with internal pressure changes of the chamber as long as critical conditions are maintained.

However, there are found various difficulties with this type of fluids supply facilities. Among these difficulties, to improve flow rate control accuracy in a small flow quantity range is the one which is needed to be solved urgently.

For example, on the assumption that flow rate control accuracy of a pressure type flow controller which rated flow rate is 1 SLM (the gas flow rate converted to a standard state) is set at 1% F.S. in a setting of less than 10%, there may be a possibility that an error of a maximum of 1 SCCM with the control flow rate value of a set 1%. Accordingly, when the control flow rate becomes less than 10% of the rated flow rate (for example, less than 10-100 SCCM), influence of the error of the aforementioned 1 SCCM cannot be ignored. As a result, an accurate flow rate control cannot be expected in a small flow quantity range of less than 100 SCCM.

With the process chamber E in the afore-shown FIG. 10, continuous operation of a primary pump VP1 and the like such as a turbo molecular pump and the like having a high compression ratio and a large exhaust volume is needed.

Furthermore, to reduce loads of the primary vacuum pump VP1 and the secondary vacuum pump VP2, it becomes necessary that a diameter of the pipe for an evacuation line Ex needs to be relatively large. In addition, a conductance valve CV, an automatic pressure controller APC and the like are required. Accordingly, equipment costs of a vacuum chamber E go high, and the reduction of the costs becomes difficult to be achieved.

Patent Literature: TOKU-KAI-HEI No. 11-212653
Patent Literature: TOKU-KAI-HEI No. 8-335846

OBJECT OF THE INVENTION

The present invention aims to solve the aforementioned problems related to a gas supply facility to a vacuum chamber equipped with a conventional pressure type flow controller and an evacuation system of the aforementioned vacuum chamber, namely, (1) difficulty in performing accurate flow control with a gas supply facility in a flow rate range of less than 1% due to the reason that flow rate control accuracy is deteriorated in a small flow quantity range, thus a flow rate control range being limited to the range of approximately 1-100%, and (2) difficulty in downsizing a facility, and reducing facility and operation costs with the exhaust system of a vacuum chamber. It is a primary object of the present invention to provide a fluids supply facility and a method for internal pressure control of the vacuum chamber for which the fluids supply facility is employed, to make it possible to perform accurate flow rate control regardless of internal pressure changes of a vacuum chamber over the wide range of the required maximum set flow rate of 0.1%-100%.

MEANS TO ACHIEVE THE OBJECT

The present invention, in accordance with a first embodiment, is fundamentally constituted so that it comprises a plurality of pressure type flow controllers connected in parallel and a controller to control the operation of an aforementioned plurality of pressure type flow controllers, and, with a gas supply facility to supply a gas while controlling the flow rate of the desired gas to a chamber exhausted by a vacuum pump, the aforementioned pressure type flow controller comprises an orifice, a pressure detector provided on the upstream side of the orifice, a control valve provided on the upstream side of the pressure detector, and a computation control part wherewith a gas flow rate Qc passing through the orifice is computed with pressure P1 detected by the pressure detector using a formula Qc=KP1 (where K is a constant) and a difference Qy with the set flow rate Qs is outputted to a control valve as a driving signal, and makes it to be used under a condition that the ratio P1/P2 on the pressure P1 on the upstream side of the orifice and the pressure P2 on the downstream side is maintained more than approximately two times, and also allows accurate flow control over the wide flow rate range by making one of the aforementioned pressure type flow controllers to be a controller to control the gas flow rate range up to 10% of the maximum flow rate to be supplied to a chamber, while the remaining pressure type flow controllers to be controllers to control the rest of the gas flow rate range.

The present invention, in accordance with a second embodiment that modifies the first embodiment, is made so that two pressure type flow controllers are connected in parallel, and one is made to be a controller for a small flow quantity range, while the other is made to be a pressure type flow controller for a large flow quantity range.

The present invention, in accordance with a third embodiment that further modifies the first embodiment, is made so that two pressure type flow controllers are connected in parallel, and the flow rate range of the pressure type flow controller for a small flow quantity is made to be 0.1-10% of the maximum flow rate, while the flow rate range of the other pressure type flow controller for a large flow quantity is made to be 10-100% of the maximum flow rate.

The present invention, in accordance with a fourth embodiment that further modifies the first embodiment, is constituted so that a plurality of pressure type flow controller is made to be operated starting with a pressure type flow controller for a smaller flow quantity range to one for a larger flow quantity in turn by means of control signals remitted from a signal conversion part in the controller.

The present invention, in accordance with a fifth embodiment that modifies the first embodiment, is constituted so that a rising rate setting mechanism of control signals to be remitted to the pressure type flow controllers allotted for all the flow rate ranges is provided with the flow controllers, and the pressure type flow controllers supply the set flow rate of gas after a specified lapse of time following the remittance of the aforementioned control signals.

The present invention, in accordance with a sixth embodiment, is fundamentally constituted so that, with a chamber whereto gas is supplied from a gas supply facility equipped with a pressure type flow controller, and wherewith the inside is continuously decompressed by a vacuum pump through an exhaust line equipped with a conductance valve, firstly the aforementioned vacuum pump is continuously operated to supply a desired gas from a gas supply facility, relationships between a gas supply flow rate and an internal pressure of a chamber are determined at both the maximum degree and minimum degree of opening of the aforementioned conductance valve respectively, and next, a control range is determined for a gas supply flow rate to a chamber equipped with the aforementioned exhaust system and the control range of the internal pressure of the chamber out of relationships of the internal pressure of the chamber and the gas supply rates, and a gas flow rate is regulated while the gas being supplied from the aforementioned gas supply facility to the gas supply flow rate corresponding to the internal pressure of the chamber to be set determined out of the line to show relationships between the gas supply flow rate and the internal pressure of the chamber is maintained at the desired set pressure.

The present invention, in accordance with a seventh embodiment that modifies the sixth embodiment, is made so that the internal pressure of a chamber is maintained at the set pressure by regulating both opening of a conductance valve of the exhaust system and the supply flow rate of the gas from a gas supply facility.

The present invention, in accordance with an eighth embodiment, is made so that a gas supply facility is made to be a gas supply facility in accordance with the first embodiment of the invention.

EFFECTS OF THE INVENTION

With a gas supply facility to a chamber according to the present invention, the required flow rate range is divided into a plural number of flow rate ranges, and a small flow quantity range of less than 10% of the maximum flow rate is controlled by a pressure type flow controller for a small flow quantity, thus accurate flow rate control being achieved over the wide flow range.

In addition, it is constituted so that when a flow rate control by pressure type flow controllers allotted to all the flow rate ranges overlaps, the rising rate of control signals is restricted to make the flow rate Q of the gas to be supplied to a chamber continuously controlled. With regard to a method for an internal pressure control of a chamber, an internal pressure of a chamber can be easily adjusted to and maintained at a specified set pressure due to the reason that a gas flow rate to be supplied to a chamber can be adjusted accurately and quickly. Accordingly, a conventional automatic pressure controller APC can be eliminated, thus making it possible that facility costs for an exhaust system of a chamber are substantially reduced. Furthermore, for a vacuum pump, an exhaust volume of the pump needs only to be big enough for the lowest pressure to a chamber previously set, not requiring a vacuum pump to have a considerable margin for the exhaust volume as happened with a conventional exhaust system to a chamber. As a result, substantial reduction of the costs for an evacuation system can be achieved.

BRIEF DESCRIPTION OF THE DRAWINGS

FIG. 4 is a diagram to show relationships between an input state of control signals to pressure type flow controllers, and flow rate output Q1 and Q2 of the pressure type flow controllers and pressure P inside the chamber E with a gas supply facility A in FIG. 1. (a) denotes the case when flow rates of two pressure type flow controllers are made to change from 0% to 100% in 60 seconds, (b) the case when flow rates are made to change from 0% to 100% in 30 seconds, and (c) the case when flow rates are made to change from 0% to 100% in step-like.

LIST OF REFERENCE CHARACTERS AND NUMERALS

A Gas supply facility
Gs Supply gas
FCS(A) Pressure type flow controller for a small flow quantity
FCS(B) Pressure type flow controller for a large flow quantity
Q1 Control flow rate for a pressure type flow controller for a small flow quantity
Q2 Control flow rate for a pressure type flow controller for a large flow quantity
Q Supply flow rate to a chamber
P Pressure inside a chamber
E Process chamber
APC Automatic pressure controller
CV Conductance valve
VP Vacuum pump
V1-V3 Control valves
L1 Gas supply pipe
L2-L3 Exhaust pipes
1 Controller
1a Flow rate input setting part
1a' and 1a" Control signal rising rate setting mechanisms
1b Signal conversion part
1c and 1d Control signals

DETAILED DISCLOSURE OF THE INVENTION

Best Mode to Carry Out the Invention: the following embodiments of the present invention are described hereunder with reference to the drawings.

The First Illustrative Embodiment

Figure 1:
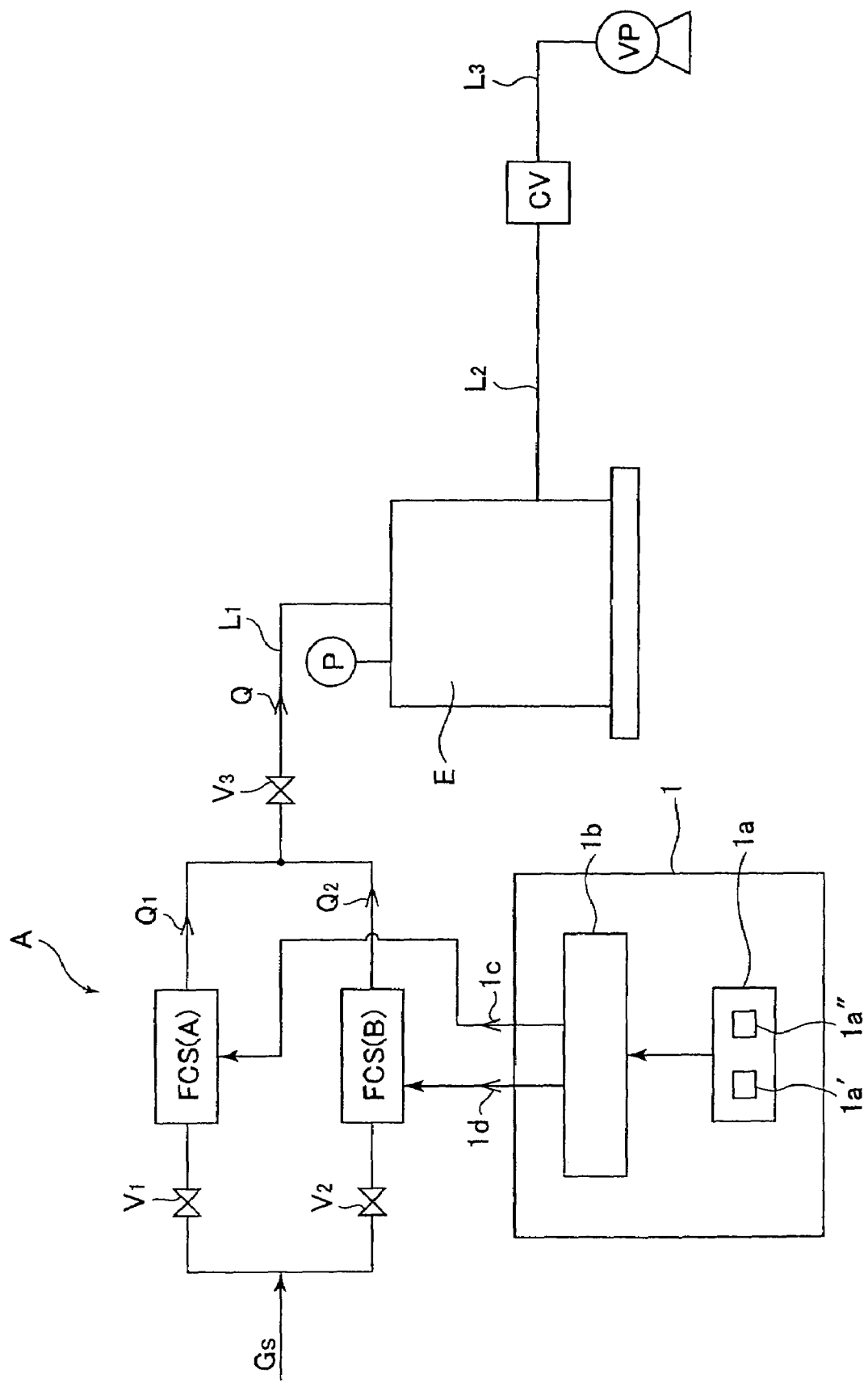
FIG. 1 is a whole system diagram of the first embodiment of a gas supply facility to a chamber according to the present invention. The gas supply facility has been used for the basic experiment.

FIG. 1 shows the first illustrative embodiment of a gas supply facility to a chamber according to the present invention, which is a basic pattern of the gas supply facility.

With FIG. 1, A designates a gas supply facility, Gs designates a supply gas, FCS(A) designates a pressure type flow controller for a small flow quantity, FCS(B) designates a pressure type flow controller for a large flow quantity, E designates a chamber, Q1 designates a control flow rate of a pressure type flow controller FCS(A) for a small flow quantity, Q2 designates a control flow rate of a pressure type flow controller FCS(B) for a large flow quantity, Q designates a supply flow rate to a chamber E, P designates pressure inside a chamber E, CV designates a conductance valve, VP designates a vacuum pump, V1-V3 designate control valves, L1 designates a gas supply pipe, L2 and L3 designates exhaust pipes, 1 designates a controller, 1a designates a flow rate input setting part, 1b designates a signal conversion part, and 1c and 1d designate control signals.

The aforementioned pressure type flow controllers FCS(A) and FCS(B) are basically identical to a conventional pressure type flow controller shown in FIG. 1. It is so constituted that a gas flow rate passing through an orifice is computed with a formula $Qc=KP1$ (where K is a constant) by satisfying conditions that P1/P2 or critical conditions of fluids between pressure P1 on the upstream side of an orifice and pressure P2 on the downstream side of an orifice are larger than approximately 2, and a control valve V provided on the upstream side is automatically controlled for opening and closing by the difference Qy between the computed value Qc and the set value Qs to regulate pressure P1 so that the flow rate actually passed through an orifice is adjusted to the aforementioned set value Qs.

With the embodiment, it is so constituted that an accurate flow rate control can be continuously performed over the flow rate range from a minimum of 5 SCCM to a maximum of 3100 SCCM by using one with a rated flow rate of 100 SCCM as a pressure type flow controller FCS(A) for a small flow quantity, and one with a rated flow rate of 3000 SCCM as a pressure type flow controller FCS(B) for a large flow quantity.

The constitution of the aforementioned pressure type flow controllers FCS(A) and FCS(B) have been disclosed to the public. So, detailed explanations are omitted herewith.

The inside capacity of the aforementioned process chamber E is set at 11 liters, and is continuously evacuated through evacuation lines L2-L3 equipped with an automatic pressure controller APC and a conductance valve CV by means of a vacuum pump having an exhaust capacity of 300 liters/min, to maintain the inside of the chamber E in the vacuum of $10^{-2}$-$10^{1}$.

The aforementioned conductance valve CV is for regulating a pipe conductance for the evacuation system. A conductance valve CV has been disclosed to the public. So, detailed explanations are omitted herewith.

A stainless steel pipe with an external diameter of 6.35 mm $\phi$ and an internal diameter of 4.2 mm $\phi$ and a stainless steel pipe with an external diameter of 28 mm $\phi$ and an internal diameter of 24 mm $\phi$ are used for the aforementioned gas supply pipe L1 and exhaust pipes L2 and L3 respectively.

The aforementioned controller 1 comprises an input setting part 1a and a signal converter 1b, and a desired flow rate (%) to the rated maximum flow rate is set at the input setting part 1a.

Namely, a rising rate setting mechanism 1a' of a control signal 1c for a pressure type flow controller FCS(A) for a small flow quantity and a rising rate setting mechanism 1a" of a control signal 1d for a pressure type flow controller FCS(B) for a large flow quantity are provided with the input setting part 1a. As stated later, the flow rate of process gas Gs required for a process chamber E is set with the input setting part 1a.

As stated later, to make both pressure type flow controllers FCS(A) and FCS(B) operated by setting a flow rate at any given rate from the minimum flow rate of 0% to the maximum flow rate of 100%, the aforementioned rising rate setting mechanisms 1a' and 1a" of input signals for the input setting part 1a function to regulate the rising rates of control signals 1c and 1d applied to the pressure type flow controllers FCS(A) and FCS(B) for both small and large flow quantities.

For example, in the event that gas Gs while being supplied at the set flow rate of 50 SCCM (an input set value of 1.613%) is increased to 2000 SCCM (an input set value of 64.516%), the operation of a pressure type flow controller FCS(A) for a small flow quantity is switched to the operation of both pressure type flow controllers FCS(A) and FCS(B). It becomes necessary to make some lag time adjustment (approximately 30 seconds for a flow rate change of 0→100%) for a pressure type flow controller FCS(B) for a large flow quantity to reach 1900 SCCM by regulating a rising rate of a control input signal $1d$ to FCS(B).

The aforementioned signal conversion part $1b$ is for outputting control signals $1c$ and $1d$ to both pressure type flow controllers FCS(A) and FCS(B) corresponding to the input setting (%) of the flow rates.

Control signals of a pressure type flow controller FCS(A) with the maximum flow rate of 100 SCCM and a pressure type flow controller FCS(B) with the maximum flow rate of 300 SCCM are set for values of 0V (0 SCCM) to 5V (100 SCCM) and for values of 0V (0 SCCM) to 5V (3000 SCCM) respectively, and control signals $1c$ and $1d$ corresponding to allotted control flow rates are inputted to both pressure type flow controllers FCS(A) and FCS(B) from a signal conversion part $1b$.

Figure 2:
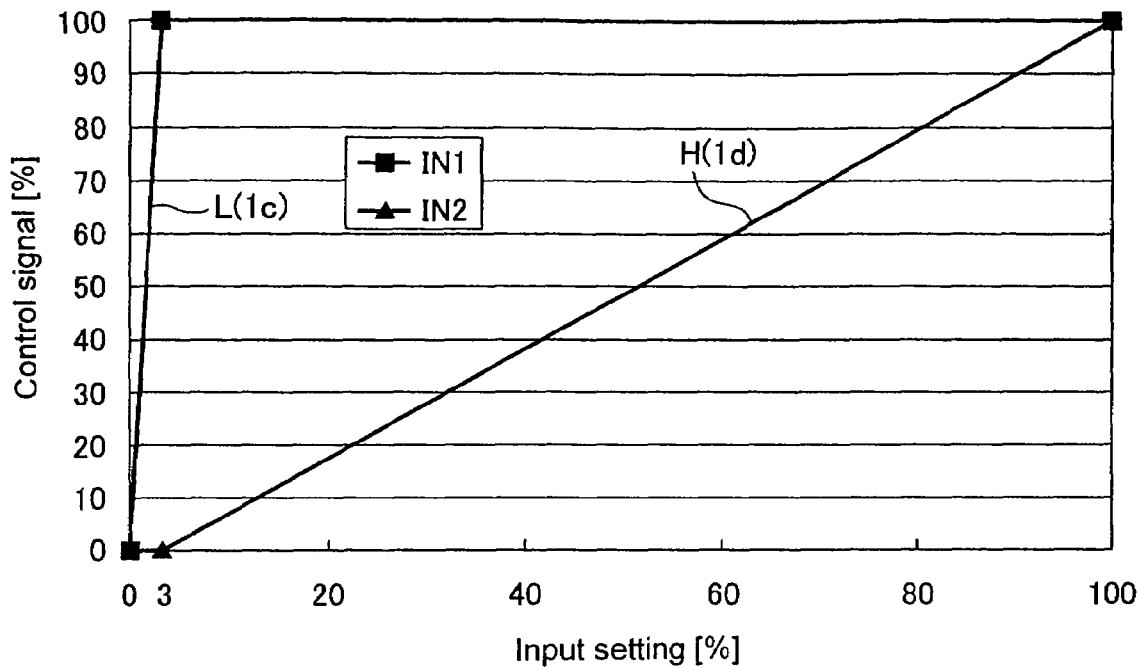
FIG. 2 is a diagram to show relationships between an input setting (%) and a control signal (%) with a gas supply facility A in FIG. 1.

FIG. 2 is a diagram to show relationships between a flow rate input setting (%), and control signals $1c$ and $1d$ at an input setting part $1a$ of the aforementioned controller 1. In FIG. 2, a curve L shows a control signal $1c$ of a pressure type flow controller FCS(A) for a small flow quantity (100 SCCM), and a curve H shows a control signal $1d$ of a pressure type flow controller FCS(B) for a large flow quantity (3000 SCCM). For example, when a set flow rate is 50 SCCM (a set flow rate %=50/3100=1.613%), only the FCS(A) is made operated, and a control signal $1c$=5V×50/100=2.5V is inputted to the FCS(A).

Similarly, when a set flow rate is 2000 SCCM (a set flow rate %=2000/3100=64.52%), the FCS(A) outputs a flow rate of 100 SCCM with a flow rate setting %=100%, and an control signal $1c$=5V×100/100=5V is inputted to the FCS(A), while the FCS(B) outputs a flow rate of 1900 SCCM, and a control signal $1d$=5V×1900/3000=3.17V is inputted to the FCS(B).

Figure 3:
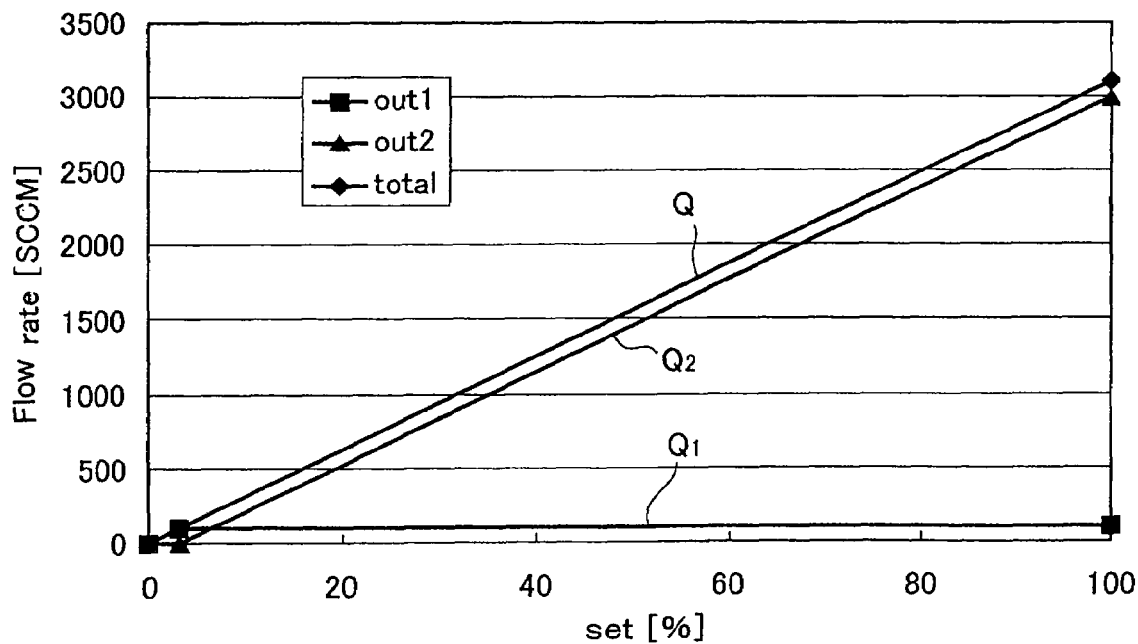
FIG. 3 is a diagram to show relationships between a flow rate setting (%), and a flow rate (%) of pressure type flow controllers and a supply flow rate Q to a chamber E with a gas supply facility A in FIG. 1.

FIG. 3 is a diagram to show relationships between allotted control flow rates Q1 and Q2 of both pressure type flow controllers FCS(A) and FCS(B) and a total supply flow rate Q to a chamber E with a fluids supply facility A in FIG. 1. A total flow rate Q is Q=100/3·set % (when only the FCS(A) is made operated, and Q is less than 100ACCM), or a total flow rate Q is Q=3000/97·set %+700/97 SCCM (when both the FCS(A) and the FCS(B) are made operated, and Q is more than 100 SCCM).

Figure 4:
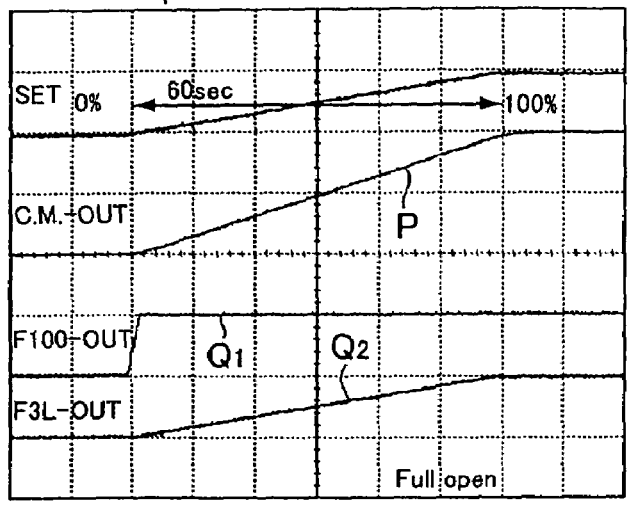
Figure 4:
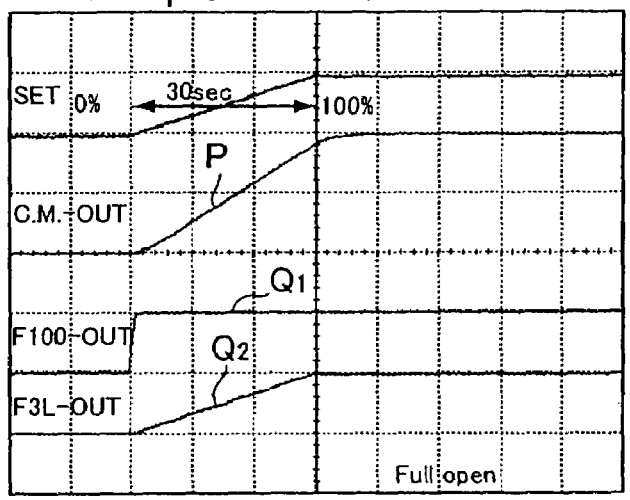
Figure 4:
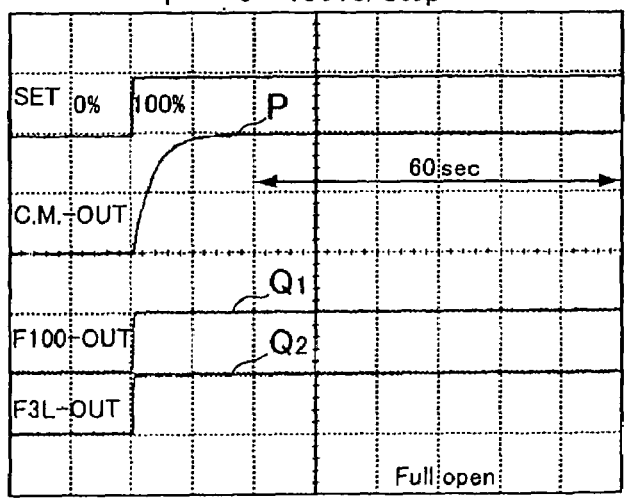

FIG. 4 ($a$)-($c$) are experimental data to explain the needs for the aforementioned control signal rising rate setting mechanisms $1a'$ and $1a''$, and show relationships between a state of application of flow rate control signals $1c$ and $1d$, and followability of a control flow rate Q to pressure P of a chamber in the event that both FCS(A) of 100 SCCM and FCS(B) of 3000 SCCM are made operated, and a total flow rate is increased from 0% (0 SCCM) to 100% (3100 SCCM). With the experiment, a conductance valve CV of the exhaust system of a chamber is set to be in a state of full opening (a state wherein a vacuum pump VP is continuously under a full operation).

Namely, FIG. 4 ($a$) shows a state of changes in pressure P of a chamber in the event that a setting signal to an input setting part $1a$ is made to change from 0% to 100% approximately in 60 seconds.

FIG. 4 ($b$) shows a state of changes in pressure P of a chamber in the event that a setting signal to an input setting part $1a$ is made to change from 0% to 100% approximately in 30 seconds. Further, FIG. 4 ($c$) shows a state of changes in pressure P of a chamber in he event that a setting signal to an input setting part $1a$ is made to change in step-like.

With FIG. 4 ($a$) and FIG. 4 ($b$), it is learned that so-called pressure control is perfectly achieved in a state wherein pressure P of a chamber continuously increases nearly proportional to the flow rate setting % (SET).

With Figure ($c$), however, it is found that pressure P of a chamber (a supply flow rate Q to a chamber E) is not able to change in step-like to step changes of a flow rate setting % (SET) (that is, step changes of a control signal $1c$ (or a flow rate Q1) and a control signal $1d$ (or a flow rate Q2)), thus making it impossible for a control of pressure P of a chamber for approximately 20 seconds to follow.

The Second Illustrative Embodiment

Figure 5:
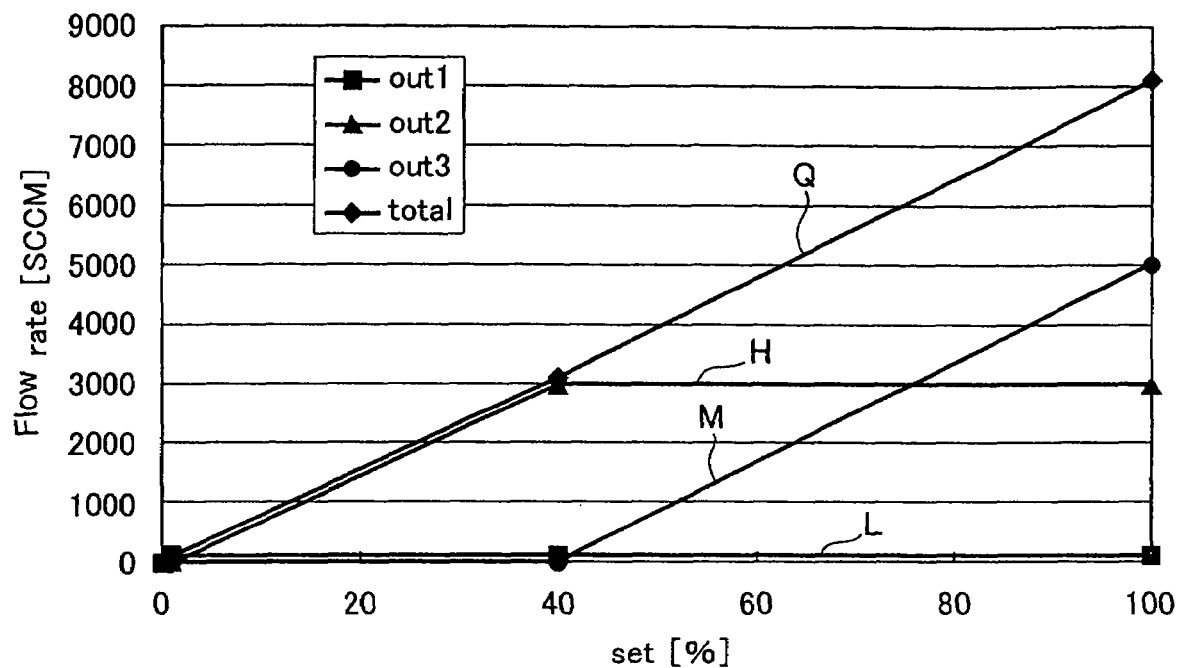
FIG. 5 is a diagram to show relationships between a flow rate setting (%) of a gas supply facility and a supply flow rate Q with regard to the second embodiment according to the present invention wherein three pressure type flow controllers are employed.

FIG. 5 is a diagram to show relationships between a set flow rate and a flow rate output in the second embodiment for a fluids supply facility according to the present invention. With the second illustrative embodiment, it is so constituted that these pressure type flow controllers FCS(A), FCS(B) and FCS(C) with the rated flow rates of 100 SCCM, 3000 SCCM and 5000 SCCM respectively are employed, thus achieving accurate flow control over the wide flow rate range of 5 SCCM-8100 SCCM.

With FIG. 5, flow rate characteristics of pressure type flow controllers FCS(A), FCS(B) and FCS(C) are shown by a curve L for 100 SCCM, a curve H for 3000 SCCM and a curve M for 5000 SCCM respectively. Q is a supply flow rate to a chamber E.

That is, when a supply flow rate Q is less than 100-3100 SCCM, a flow rate Q is determined by a formula:

$$Q=(3100-10)/(40-1)\cdot(\text{SET }\%-1)+100$$

When a supply flow rate Q is 3100-8100 SCCM, a flow rate Q is determined by a formula:

$$Q=(5000/60)\cdot\text{SET }\%-(14000/60)$$

With the first illustrative embodiment in FIG. 1 and the second illustrative embodiment in FIG. 5, it is assumed that the one kind of supply gas was used. However, when more than two types of supply gas are used, the same number of gas supply facilities A shown in the first embodiment and the second embodiment as the number of different gas types can be provided in parallel, and gas supply facilities A are arbitrarily switched for operation, thus allowing a plurality of gases to be supplied to a chamber E.

Furthermore, with the first and second illustrative embodiments, a single type of supply gas Gs is used. However, there is no need to say that a supply gas Gs can be a mixed gas, for example, mixture of Ar and CF4 (with an arbitral mixing rate).

(A method for an internal pressure control of a chamber for which a gas supply facility is employed)

The Third Illustrative Embodiment

Figure 6:
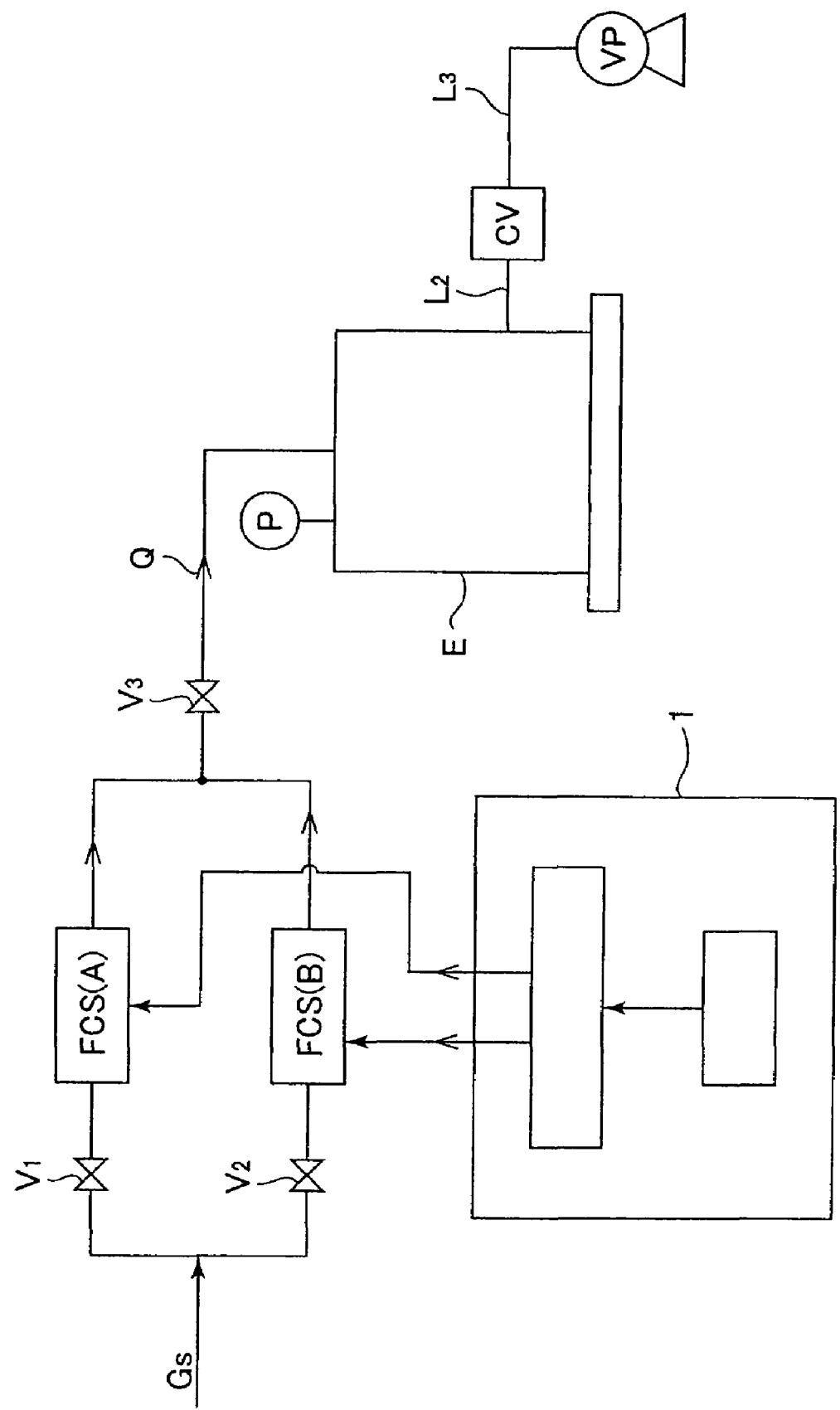
FIG. 6 is a whole system diagram to show a state of implementation of a method for an internal pressure control for which a gas supply facility according to the present invention is employed.

FIG. 6 is a whole system diagram to show a method for an internal pressure control of a chamber for which a gas supply facility according to the present invention is employed.

Referring to FIG. 6, a chamber E has an inside capacity of 11 liters, and its exhaust system comprises a conductance valve CV, a vacuum pump VP, an exhaust pipe L2, and an exhaust pipe L3. A vacuum pump has an exhaust volume of 300 liters/min.

The method for an internal pressure control of the chamber is that an internal pressure inside a chamber E continuously exhausted by a vacuum pump having a certain exhaust capacity is regulated to a specified process pressure of approximately $10^{-2}$-$10^2$ Torr by finely adjusting the flow rate of fluids supplied therein.

Referring to FIG. 6, firstly a conductance valve CV is fully opened to make a flow passage resistance to a minimum, and a vacuum pump VP is operated to evacuate a chamber to a degree of vacuum to meet the evacuation capacity of the vacuum pump VP.

Figure 7:
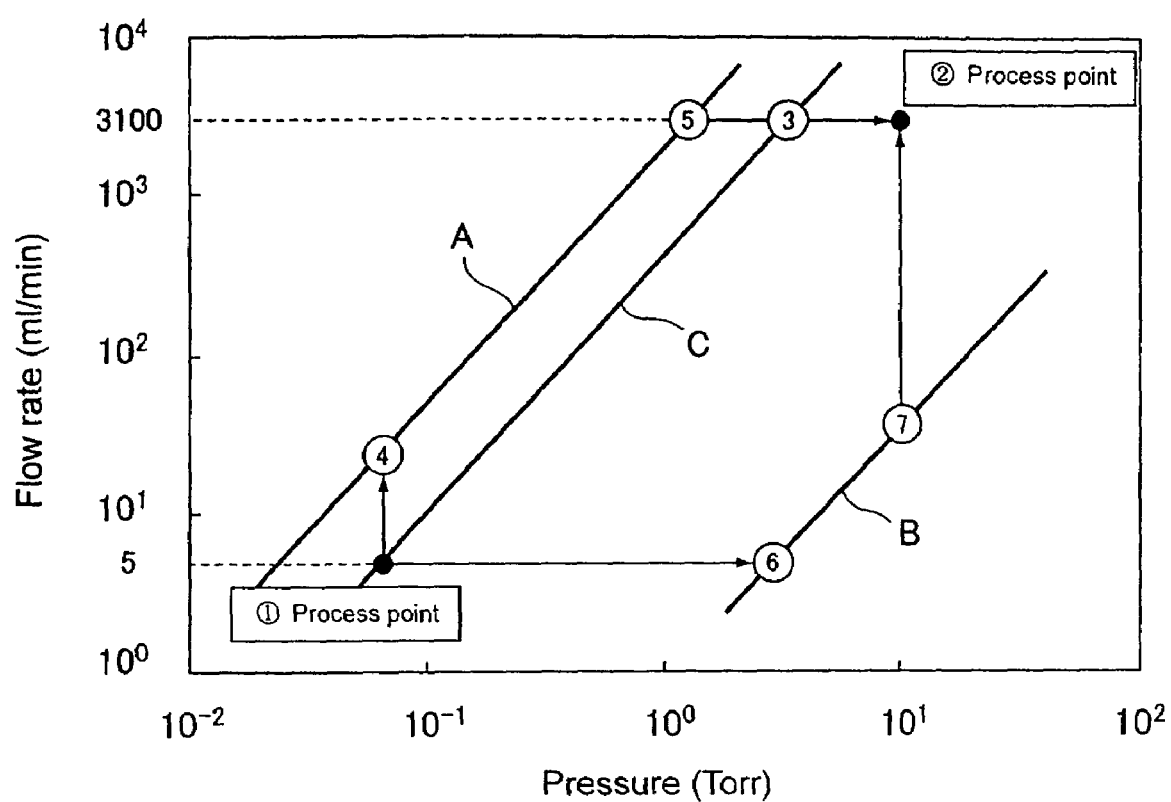
FIG. 7 is a diagram to show relationships between an internal pressure P which can be controlled with the method for an internal pressure control of a chamber and a supply flow rate Q illustrated in FIG. 6.
Figure 8:
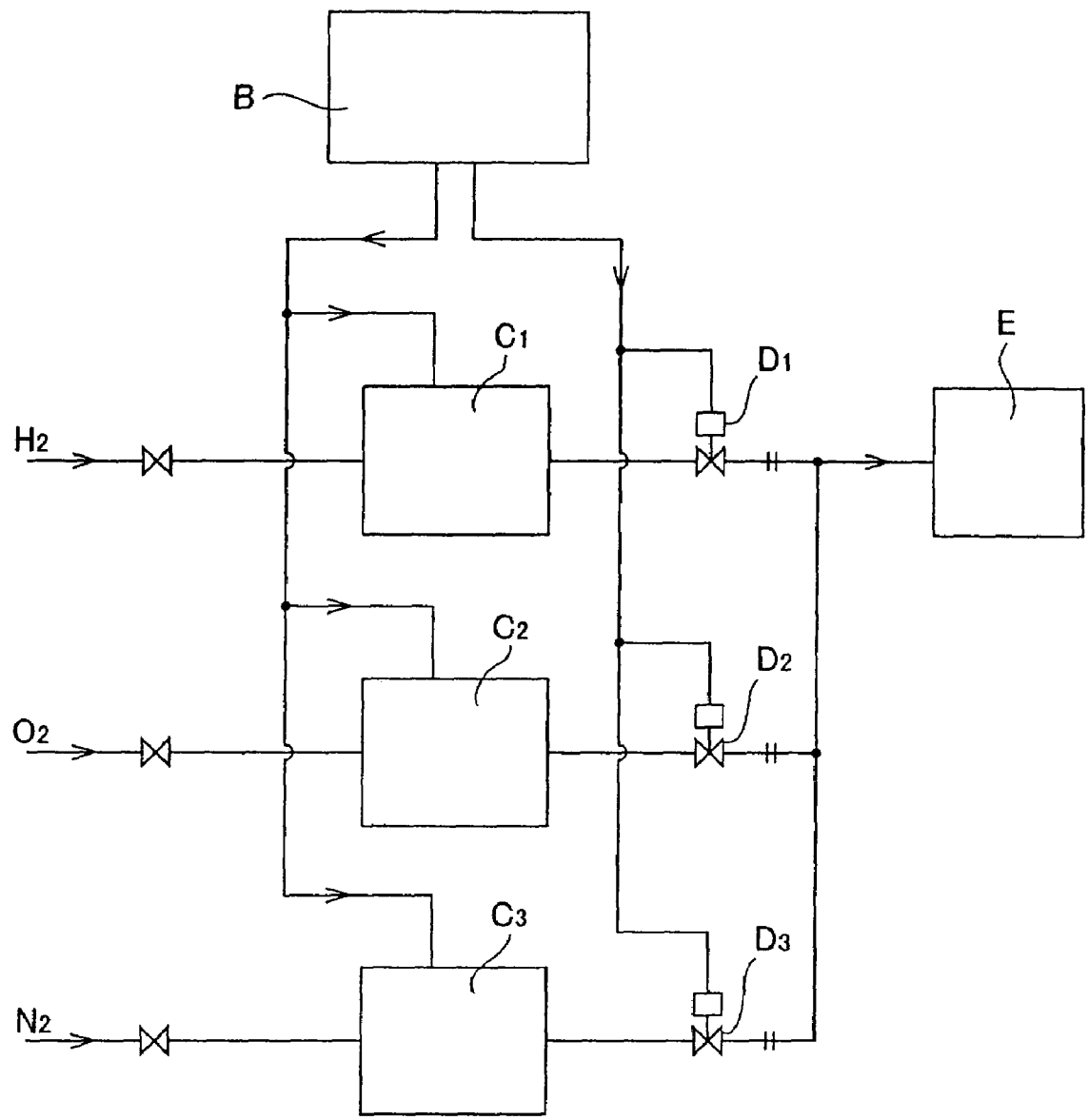
FIG. 8 is an explanatory drawing of a fluids supply facility wherein a conventional pressure type flow controller is employed.
Figure 9:
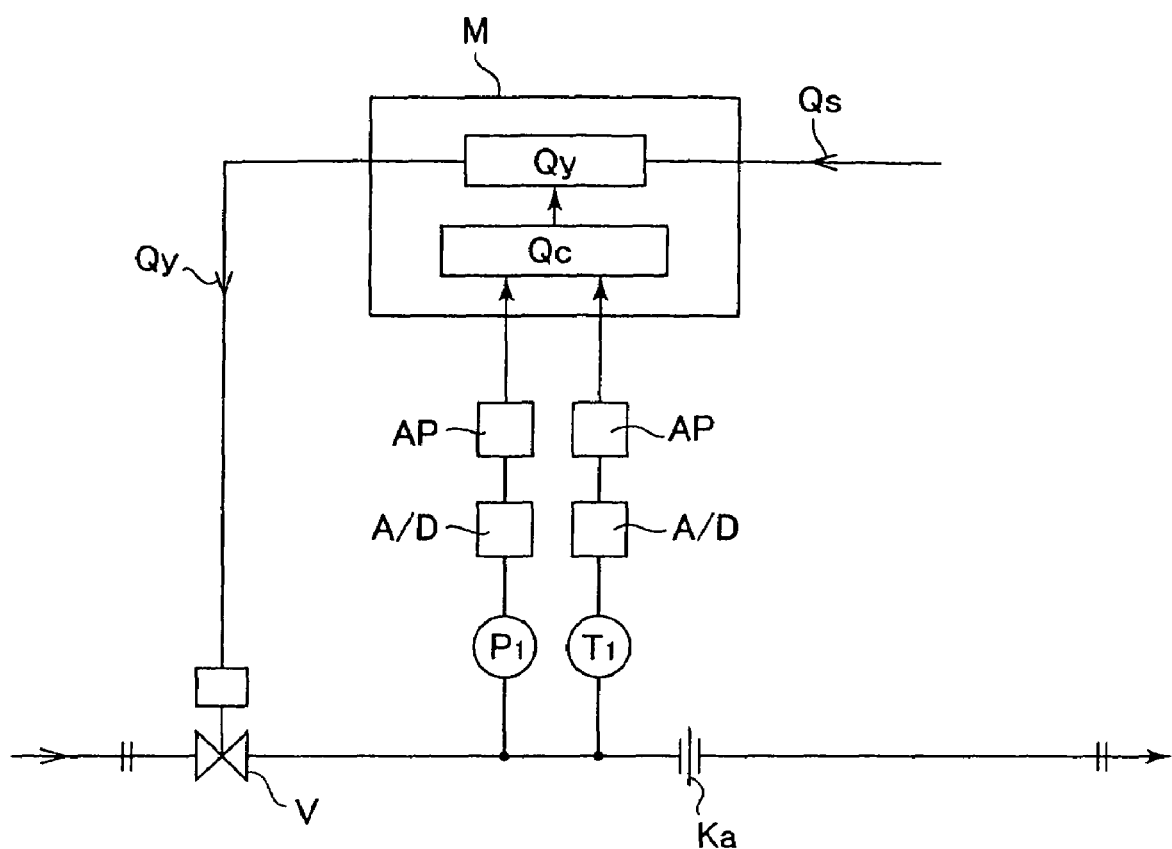
FIG. 9 is a block diagram of a pressure type flow controller.
Figure 10:
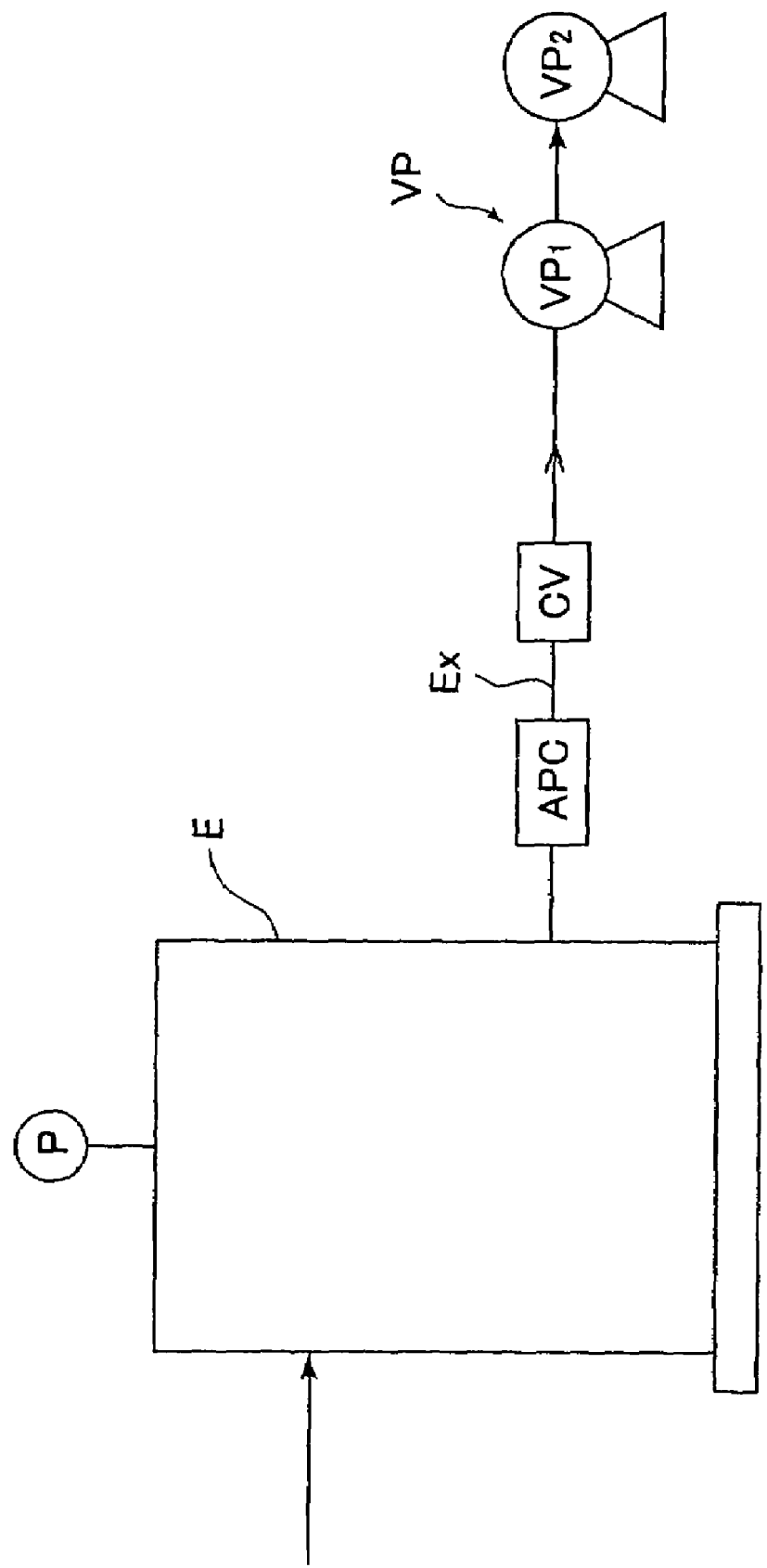
FIG. 10 is an explanatory drawing to show an exhaust system of a conventional process chamber.

Next, a flow rate Q of the supply gas to pressure P is determined by the pressure-flow rate characteristic curve of a chamber E and an evacuation system in FIG. 7 determined beforehand.

Then, a gas supply facility A is operated to supply a flow rate Q of the gas Gs required to gain the aforementioned set pressure P into a chamber E.

The range of an internal pressure adjustment inside the chamber E by the supply of the gas Gs can be changed by regulating the degree of opening of a conductance valve CV when the evacuation capacity of a vacuum pump is constant. As stated later, in the event that an internal pressure of a chamber is to be raised (a low degree of vacuum), the degree of opening of a conductance valve CV is made small to increase a flow passage resistance of the evacuation system, while in the event that an internal pressure of a chamber is to be lowered (a high degree of vacuum), a conductance valve CV is fully opened.

FIG. 7 is a diagram to show relationships between a supply flow rate Q to a chamber E in regard to the chamber E and the evacuation system, and the internal pressure P of the chamber. It shows the pressure-flow rate characteristics at the time when a vacuum pump is continuously operated at its rating and the degree of opening of a conductance valve CV is made either at its maximum or minimum.

Namely, a curve A in FIG. 7 shows the pressure-flow rate characteristics when opening of a conductance valve CV is at the widest. A curve B shows the pressure-flow rate characteristics when opening of a conductance valve CV is at the narrowest.

A curve C shows the pressure-flow rate characteristics at an arbitrary conductance of an evacuation system to realizes an arbitrary process point (1) or (2) inside the chamber E.

As apparent in FIG. 7, with a chamber E and an evacuation system in FIG. 6, a gas flow rate Q to the chamber E is regulated between 5-3100 SCCM, and a conductance of the evacuation system is appropriately regulated, thus making it possible that pressure inside a chamber E over the flow rate/pressure range bordered with numbers (1)-(4)-(5)-(3)-(2)-(7)-(6), in case of pressure, $10^1$–$0.8 \times 10^{-1}$ Torr, can be regulated. Needless to say, by changing the constitution of an exhaust system (a conductance of an exhaust system, an evacuation capacity of a vacuum pump VP and the like) and a flow rate control range of a fluids supply facility A, the adjustment range of a flow rate/pressure (areas bordered by dotted lines) in the afore-shown FIG. 7 can be changed. Therefore, it becomes possible that a flow rate range of a fluids supply facility A and an evacuation capacity of a vacuum pump VP are chosen appropriately depending on the conditions required for a process chamber E.

It is noted that, with semiconductor manufacturing facilities and the like, a pressure control rage is normally set at $10^{-2}$–$10^1$ Torr, and a flow rate control range Q at 3 SCCM-5000 SCCM.

Inactive gases such as He, Ar and the like, or gases mixed therewith, are used for gases Gs to be supplied into a chamber E for pressure adjustment.

Furthermore, there is no need to say that a process gas itself or a mixed gas can be used for the gas Gs supplied into the aforementioned chamber E.

Feasibility of Industrial Use

The present invention is adaptable for use of a control of gases supplied to a process chamber in a semiconductor manufacturing facility, a control of internal pressure inside a process chamber, and the like.

The invention claimed is:

1. A gas supply facility for a chamber, wherein the gas supply facility comprises:
   (a) a chamber exhausted by a vacuum pump;
   (b) a first pressure type flow controller controlling a small flow rate corresponding to 10% of a maximum flow rate of the gas supply facility to the chamber;
   (b) a second pressure type flow controller controlling a large flow rate corresponding to 90% of the maximum flow rate of the gas supply facility to the chamber, wherein the second pressure type flow controller is connected in parallel with the first pressure type flow controller;
   (c) a third controller operably connected to control operation of the first pressure type flow controller and the second pressure type flow controller; wherein
   the first pressure type flow controller and the second pressure type flow controller each comprises
      i. an orifice;
      ii. a pressure detector provided on an upstream side of the orifice;
      iii. a control valve provided on an upstream side of the pressure detector; and
      iv. a computation control part that computes gas flow rate Qc of gas passing through the orifice using pressure P1 detected by the pressure detector and using formula Qc=KP1, where K is constant, so that a difference Qy with a set flow rate Qs is outputted as a driving signal to the control valve so that a ratio P1/P2 of pressure P1 on the upstream side of the orifice and pressure P2 on the downstream side of the orifice is maintained at approximately two or more, wherein accurate flow control over a wide flow rate range is achieved because the first pressure type flow controller controls the small flow rate gas flow rate range up to 10% of the maximum flow rate supplied to the chamber, while the second pressure type flow controller controls the large flow rate gas flow rate range of about 10-100% of the maximum flow rate supplied to the chamber; and
   wherein the third controller comprises
      i. an input setting part that sets the maximum flow rate of gas supplied to the chamber; and
      ii. a signal conversion part;
   wherein the first pressure type flow controller is initially operated to control small flow rate and when flow rate reaches 10% of the maximum flow rate the second pressure type flow controller is switched into operation, wherein first control signals for both the first pressure type flow controller and the second pressure type flow controller are provided by the signal conversion part thereby enabling accurate flow rate control over a wide flow rate range by remitting first control signals from the signal conversion part to the first pressure type flow controller and the second pressure type flow controller.

2. A gas supply facility as claimed in claim 1, further comprising:
   (e) a rising rate setting mechanism operably connected to remit second control signals to the first pressure type flow controller and the second pressure type flow controller so as to control a large flow range, and said second pressure type flow controller controlling the large flow rate supplies the set flow rate of gas after a specified lapse of time following remittance of the second control signals.

3. A method for internal pressure control of a chamber, the method comprising the steps of:
   (a) continuously operating a vacuum pump to decompress, through an exhaust line equipped with a conductance valve, a chamber supplied with a gas from a gas supply facility equipped with a first pressure type flow controller controlling a small flow rate corresponding to 10% of a maximum flow rate of the gas supply facility to the chamber and a second pressure type flow controller controlling a large flow rate corresponding to 90% of the maximum flow rate of the gas supply facility to the chamber, wherein the second pressure type flow controller is connected in parallel with the first pressure type flow controller, wherein the first pressure type flow controller is initially operated to control small flow rate and when flow rate reaches 10% of the maximum flow rate the second pressure type flow controller is switched into operation and the first pressure type flow controller and the second pressure type flow controller each comprises
      i. an orifice;
      ii. a pressure detector provided on an upstream side of the orifice;
      iii. a control valve provided on an upstream side of the pressure detector; and
      iv. a computation control part that computes a first gas flow rate $Qc$ of gas passing through the orifice using pressure $P1$ detected by the pressure detector and using formula $Qc=KP1$, where $K$ is constant, so that a difference $Qy$ with a set flow rate $Qs$ is outputted as a driving signal to the control valve so that a ratio $P1/P2$ of pressure $P1$ on the upstream side of the orifice and pressure $P2$ on the downstream side of the orifice is maintained at approximately two or more;
   (b) determining a relationship between a gas supply flow rate and an internal pressure of the chamber at both a maximum degree and a minimum degree of opening of the conductance valve, respectively, to ascertain a first control range for the gas supply flow rate supplied to the chamber and a second control range of internal pressure of the chamber; and
   (c) regulating the first gas flow rate, while supplying gas from the gas supply facility, so that the first gas flow rate reaches the gas supply flow rate corresponding to a desired set internal pressure of the chamber that is determined from the relationship between the gas supply flow rate and the internal pressure of the chamber in order to maintain the chamber at the desired set pressure.

4. A method for internal pressure control of a chamber as claimed in claim 3, the method further comprising the steps of:
   (d) supplying the chamber connected to both the gas supply facility and an exhaust system comprising the exhaust line having the conductance valve; and
   (e) maintaining the internal pressure of the chamber at the set pressure by regulating both opening of the conductance valve of the exhaust system and the supply flow rate of the gas supply facility.

* * * * *